(12) United States Patent
Bernard et al.

(10) Patent No.: US 6,476,327 B1
(45) Date of Patent: Nov. 5, 2002

(54) SPLIT FIBER COVER AND RACEWAY FITTING

(75) Inventors: William A. Bernard, Darien, IL (US); Nicolas Youssef, Willowbrook, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/585,697

(22) Filed: Jun. 1, 2000

(51) Int. Cl.[7] ................................................. H02G 3/00
(52) U.S. Cl. ....................... 174/101; 174/68.3; 52/220.7
(58) Field of Search ............... 174/101, 68.3, 174/96, 97, 98, 99 R; 52/220.7

(56) References Cited

U.S. PATENT DOCUMENTS

| | | | |
|---|---|---|---|
| 3,403,220 A | | 9/1968 | Reidel et al. ............... 174/101 |
| 3,636,984 A | * | 1/1972 | Rauhauser .................. 138/155 |
| 3,697,667 A | * | 10/1972 | Pollack et al. .............. 174/68.3 |
| 4,040,449 A | * | 8/1977 | Butler et al. .................. 138/92 |
| 4,254,457 A | * | 3/1981 | Lordier ....................... 362/367 |
| 4,484,020 A | * | 11/1984 | Loof et al. .................. 174/68.3 |
| D301,684 S | | 6/1989 | Herzog ........................ D8/356 |
| D302,938 S | | 8/1989 | Fujioka ....................... D8/356 |
| 4,891,471 A | | 1/1990 | Ono et al. .................. 174/68.3 |
| 4,896,784 A | | 1/1990 | Heath ......................... 220/3.2 |
| 4,937,400 A | | 6/1990 | Williams ..................... 174/95 |
| 4,951,716 A | | 8/1990 | Tsunoda et al. ............ 138/162 |
| 5,024,251 A | * | 6/1991 | Chapman ..................... 138/92 |
| 5,089,667 A | | 2/1992 | Goussin et al. ............ 174/101 |
| 5,469,893 A | | 11/1995 | Caveney et al. ........... 138/162 |
| 5,531,345 A | | 7/1996 | Nakamura et al. .......... 220/3.8 |
| 5,597,980 A | | 1/1997 | Weber ....................... 174/72 A |
| 5,602,364 A | * | 2/1997 | Ustin ......................... 174/68.3 |
| 5,709,249 A | | 1/1998 | Okada et al. ............... 138/162 |
| 6,036,040 A | | 3/2000 | Daoud ........................ 220/3.94 |
| 6,044,194 A | * | 3/2000 | Meyerhoefer ............... 385/134 |
| 6,188,024 B1 | * | 2/2001 | Benito-Navazo ............. 174/97 |
| 6,271,476 B1 | * | 8/2001 | Bobowick et al. .......... 174/135 |
| 6,318,680 B1 | * | 11/2001 | Benedict et al. ............. 248/49 |

FOREIGN PATENT DOCUMENTS

| | | |
|---|---|---|
| EP | 349376 A | 3/1990 |
| JP | 403195314 A | 8/1991 |
| JP | 406086426 A | 3/1994 |
| JP | 406165339 A | 6/1994 |

* cited by examiner

Primary Examiner—Anthony Dinkins
Assistant Examiner—W. David Walkenhorst
(74) Attorney, Agent, or Firm—Robert A. McCann; Jay A. Saltzman; Christopher S. Clancy

(57) ABSTRACT

A raceway section forms part of a raceway system for routing, protecting and enclosing cabling, and includes a base member, which may be U-shaped, and two split covers independently removably attached to side walls of the base member, such as by a hook and buckle attachment system. The base member defines a cable receiving channel and a longitudinally extending top opening. The split covers each have a laterally extending cover portion, an outside edge portion, and an inside edge portion, wherein the split covers each cover a portion of the longitudinally extending top opening such that a substantial amount of the top opening is covered. The inside edge portions are juxtaposed to form a longitudinally extending slot sufficiently wide to allow the removal or insertion of a cable through the slot without removal of the split covers. For insertion or removal of larger cables or bundles, one or both split covers can be removed.

21 Claims, 9 Drawing Sheets

SPLIT FIBER COVER AND RACEWAY FITTING

BACKGROUND OF THE INVENTION

1. FIELD OF INVENTION

The invention relates to a fiber raceway system that has improved accessability. More particularly, the invention relates to a raceway fitting having a separately removable split cover.

2. DESCRIPTION OF RELATED ART

Raceway and duct systems have become very popular in recent years to route, protect and conceal data, voice, video, fiber-optic and/or power cabling. Such systems allow custom installation and can be provided within walls or more preferably provided on external surfaces, allowing ready access for reconfiguration, repair or installation of additional equipment. Such systems can be formed from various sections of raceway or duct, including straight sections, 90 degree comer fittings, 45 degree comer fittings, T fittings, four-way intersection (X) fittings, and the like, which are affixed together by way of a duct coupler.

Typical raceway systems consist of troughs or fittings made up of a base member and a cover. The cover may be a hinged cover or a snap-on cover. In operation, the cover must be removed to allow access to a cable receiving cavity within the base member. When a long raceway made up of several raceway sections is involved, such a process requires a large amount of physical effort to remove all of the covers and to return them after the installation. Also, when the covers are fully removed, there may be the possibility that undesired cables or bundles inadvertently fall out of the raceway.

SUMMARY OF THE INVENTION

There is a need for a raceway system that can provide more flexible and simplified reconfiguration of cabling within the raceway without the need for always removing all of the raceway covers.

There also is a need for a raceway section for a raceway system that allows small cables or bundles of cables to be easily installed or removed from the raceway system, while still allowing the flexibility to remove or install large bundles of cables.

The invention achieves these and other features by providing a raceway section that forms part of a raceway system for routing, protecting and enclosing cabling, comprising: a base member having a bottom wall and two side walls defining a cable receiving channel therebetween with a longitudinally extending top opening; and two split covers independently removably attached to respective ones of the side walls, the split covers each having a laterally extending cover portion, an outside edge portion, and an inside edge portion, wherein the split covers each cover a portion of the longitudinally extending top opening such that a substantial amount of the top opening is covered and the inside edge portions are juxtaposed to form a longitudinally extending slot sufficiently wide to allow the removal or insertion of a cable through the slot without removal of the split covers.

According to a first embodiment of the invention, the inside edge portions of the split covers are spaced from each other to define the longitudinally extending slot.

In another embodiment of the invention, the inside edges of the split covers abut or overlap each other and the longitudinally extending slot is formed by at least one of the split covers being partially flexible such that the corresponding inside edge portion yields to allow insertion of a cable through the slot. Upon complete insertion of the cable through the slot, the yielding inside edge portion returns to abut or overlap the other inside edge portion.

In preferred embodiments of the invention, at least one of the inside edge portions has an outwardly curved lip.

The slot may extend substantially parallel with one of the side walls or may have a curved or sinusoidal path that does not follow the curvature of the raceway section.

The split covers may be removably affixed to the base member by a combination of a snap-shaped hook and a buckle ring attachment system.

The raceway section may take the form of any of a straight section, a right angle comer fitting, a 45 degree comer fitting , a T fitting, a four-way intersection fitting, or other conventional or subsequently contemplated sectional configurations. The raceway sections preferably are abuttable with other raceway sections to form a raceway system.

With the inventive raceway section and raceway system, cabling can be selectively inserted into or removed from individual raceway sections by several methods, including installation or removal of large bundles by removal of one or both of the split covers, and installation of one or more small cables by insertion or removal through the slot without having to remove the split covers.

BRIEF DESCRIPTION OF THE DRAWINGS

The foregoing and other features and objects of the invention will become apparent from the following drawings and description, which detail exemplary embodiments of a raceway system and split cover, wherein like numbers refer to like elements and in which.

DETAILED DESCRIPTION OF PREFERRED EMBODIMENTS

Figure 1:
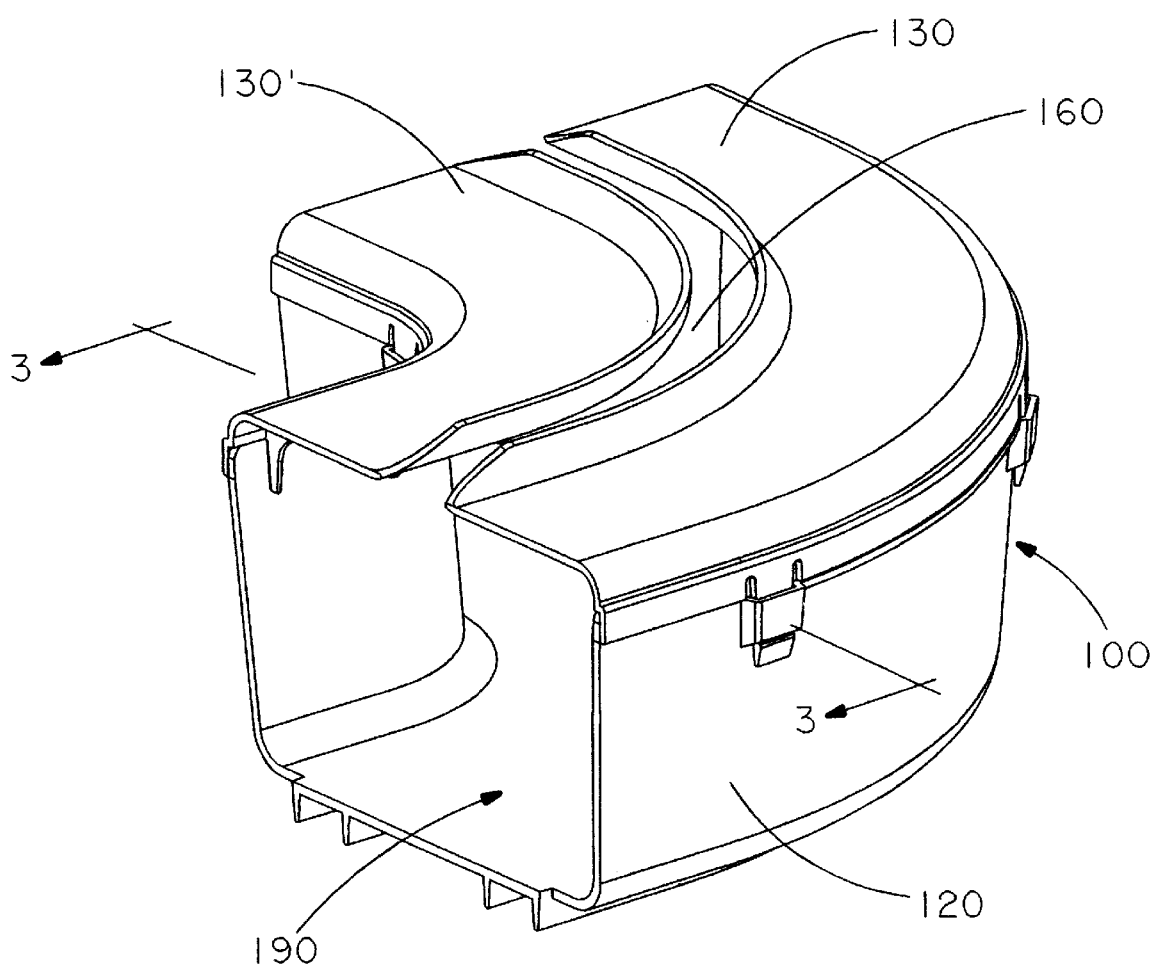
FIG. 1 is a perspective view of a fiber raceway fitting and split cover according to a first embodiment of the invention.
Figure 2:
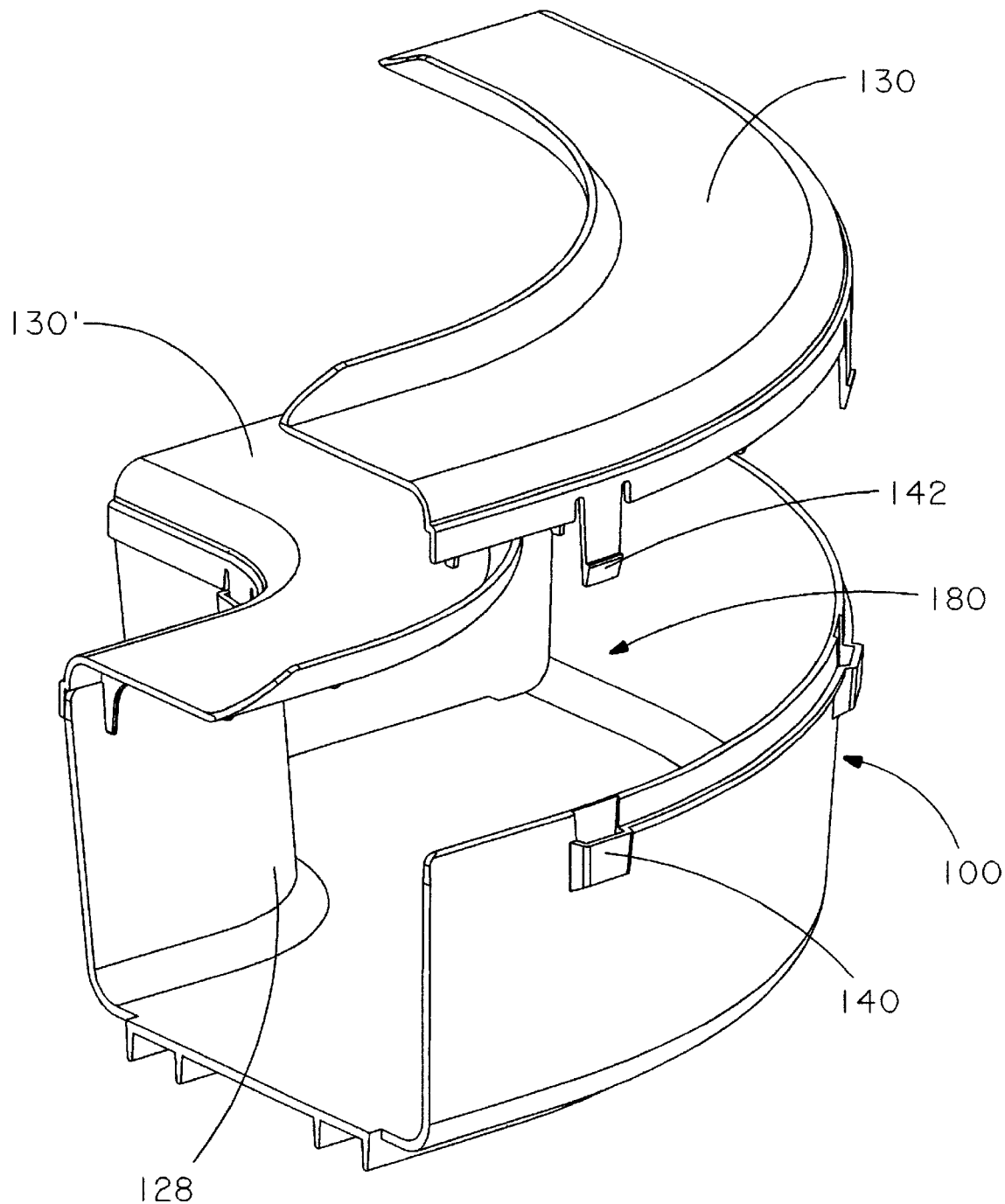
FIG. 2 is a perspective view of the fiber raceway fitting and split cover as shown in FIG. 1 with one of the covers partially removed.
Figure 3:
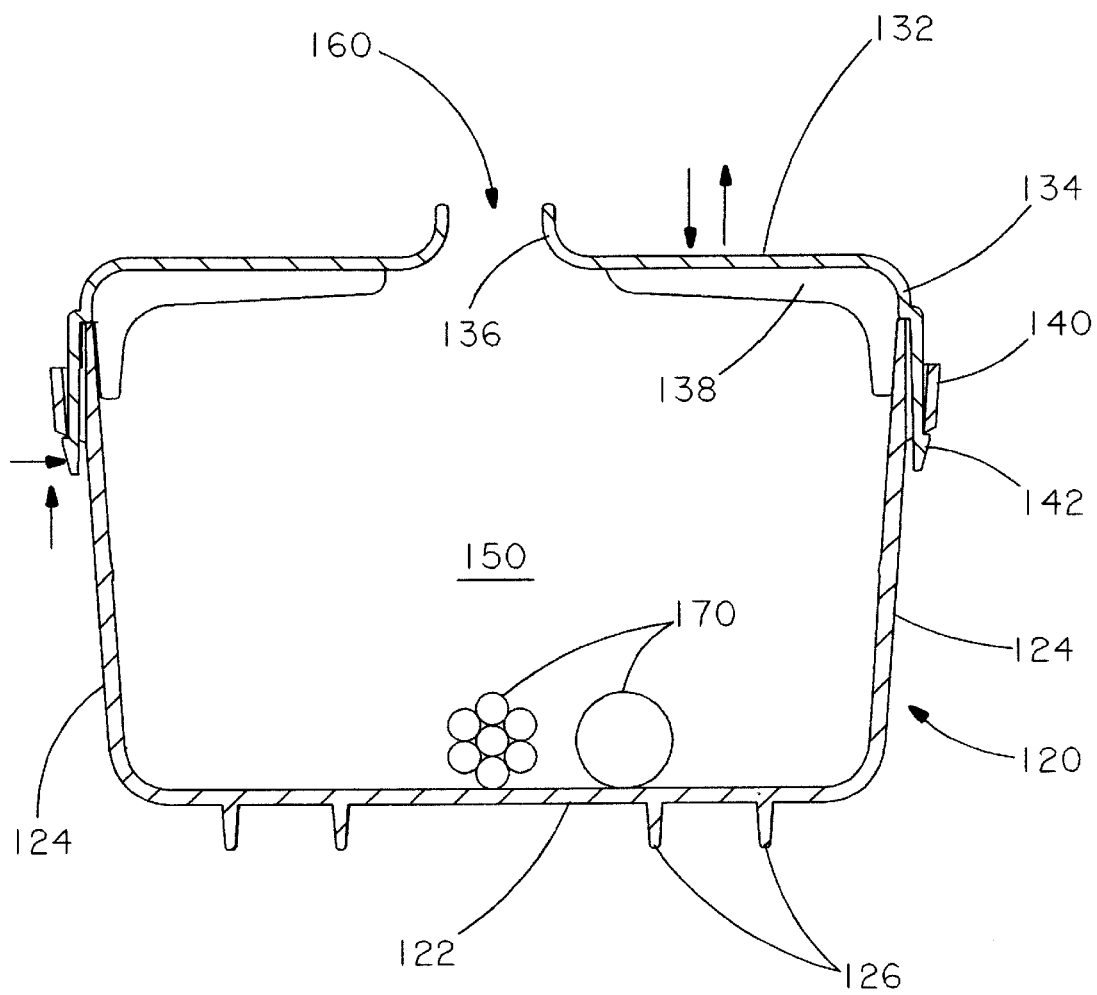
FIG. 3 is a cross-sectional view taken along line 3—3 of FIG. 1.

With reference to FIGS. 1–3, a first embodiment of the invention will be described. in this embodiment, a raceway system is provided that includes one or more raceway sections, such as the right-angle fitting 100 shown that can be mated together end to end with other sections by way of a duct coupler (unshown), such as the duct coupler disclosed in co-pending application Ser. No. 09/585,699, to form a longitudinally extending pathway. The pathway is used to route, protect and conceal data, voice, video, fiber-optic and/or power cabling Such a raceway may include raceway sections made up of various combinations of section configurations, including, but not limited to, straight raceway troughs, right angle corner fittings, 45 degree corner fittings, T fittings, four-way intersection (X) fittings, and the like Each raceway section 100 is made up of a base member 120, preferably formed in a generally U-shape, and two split covers 130, 130' that are removably affixed to the base member 120. The base member 120 includes a bottom wall 122 and two side walls 124, 124', which may be integrally formed or otherwise affixed together. The base member 120 preferably also includes one or more longitudinal ribs 126 on a lower surface of the bottom wall. The bottom wall 122 and side walls 124, 124' define a cable receiving channel 150, which is preferably, but not necessarily, rectangular. The channel has a longitudinally extending top opening 180 and one or more open ends 190. The base member 120 can be formed from any suitable material, such as plastic or metal and can be sized to acconmmodate a desired number of wires or cables. The base member 120 is preferably rigid or semi-rigid to provide support.

Each of the various raceway sections has the longitudinally extending top opening 180. Thus, when the various raceway sections are assembled together and the split covers 130, 130' are removed, a wide, common longitudinally extending opening 180 is formed. As the top side of this opening 180 is exposed, cable and the like can be readily inserted in or removed from the cable receiving channel 150. To assist in cable management, the cable receiving channel may include one or more partition walls (unshown) running longitudinally to separate cables. This may be advantageous to separate different cable types, such as power and data cables. Additionally, for use with fiber optic cable, the corner fittings such as the right angle fitting shown may be formed to have an inner angled corner wall portion 128 with a desired minimum bend radius, such as 2".

Each cover 130, 130' includes a laterally extending cover portion 132, an outside edge portion 134, which may be flanged, and an inside edge portion 136, which is preferably upwardly curved. The covers are preferably rigid or semi-rigid and may be formed from any suitable material, such as metal or more preferably plastic. To increase the rigidity of the cover, reinforcing ribs 138 may be provided. These ribs 138 may be spaced longitudinally along the cover. For further rigidity, the ribs may extend to the flanged portion of the outside edge 134.

The split covers 130, 130' are independently removable from the base member and can be removably affixed by any suitable method. A particularly useful affixing structure is the use of buckle rings 140 on one of the cover 130, 130' or the base member 120, and corresponding snap-shaped hooks 142 on the other. However, the invention is not intended to be limited to this attachment. These rings 140 and hooks 142 can be molded onto the walls in the case of the use of plastic covers and base members. If other materials are used, the hooks 142 and rings 140 can be affixed by other conventional methods. The hooks 142 and rings 140 are spaced longitudinally along the covers 130, 130' and base member 122 at predetermined spacings to retain the covers in place.

To assemble the covers 130, 130' to the base member 120, all that is required is alignment of the hooks 142 with the buckle rings 140, and insertion of the hooks 142 through buckle rings 140 until a barbed end of each hook extends beyond the ring 140. Preferably, the snap-shaped hook will naturally be biased outward to lock the barb from removal from the rings 140. To remove or unlatch the cover, a user just needs to push the barbs of the snap-shaped hooks inward toward the base member and lift upwards as represented by the arrows in FIG. 3.

When the split covers 130, 130' are affixed onto base member 120, the longitudinally extending top opening 180 is substantially or fully covered so as to protect or shield the cable receiving channel 150. However, it is preferable to provide a slot 160 between the inside edges 136 of the covers. This slot is preferably sized to allow passage of an individual cable or a small cable bundle 170. As the slot 160 is relatively narrow relative to the width of the cable receiving channel 150, the slot substantially shields the cable receiving channel 150 and substantially prevents cables from inadvertently falling out of the channel.

Slot 160 may be used to selectively remove or install individual cables or small bundles of cables 170 along the cable receiving channel 150 of the raceway system without the necessity of removing each cover 130, 130' to gain access to the channel 150. As such, reconfiguration or addition of cabling is greatly simplified and can be performed in much less time with much less effort than previous systems that relied on use of removable covers. The inward edges 136 are preferably formed with a curved lip as shown to prevent abrasion to the cables during their removal or installation. This also prevents the unintended removal of cables. When bend radius control is needed, such as in the case of routing fiber optic cabling, the slot 160 is curved to provide bend radius control during installation or removal of cable through the slot.

In the case of removal of cables, it may be necessary to remove one or both of the covers 130, 130' on a first raceway element 100 of the raceway system to find a desired cable that is to be removed. Once isolated and pulled up from the channel, the cable can be lifted up through the slot 160 of each of the remaining raceway sections without removal of the remaining covers of the system. Accordingly, even removal is greatly simplified as a maximum of one or two covers 130, 130' is all that needs to be removed to allow removal of a wire, even when there is a long series of raceway sections fitted together end-to-end to form the raceway system. However, if the cable to be removed can be located at an end of the raceway system (i.e., the cable extends beyond the raceway), it is possible to remove the cable without removing any of the raceway system covers.

Additionally, the use of two covers provides added flexibility in removal and installation of cabling as only one cover need be removed at a time. Accordingly, cabling on one side of the cable receiving channel 150 can remain covered while another side is exposed. This provides further flexibility by allowing the removal of a larger bundle of cables than could be removed through slot 160, without necessarily removing the entire cover (i.e., both covers). This may be advantageous when the cable receiving channel 150 is partitioned into various sections, such as to divide and separate power and data cable. In such a case, it may be preferable not to disturb one of the cable sections.

Figure 4:
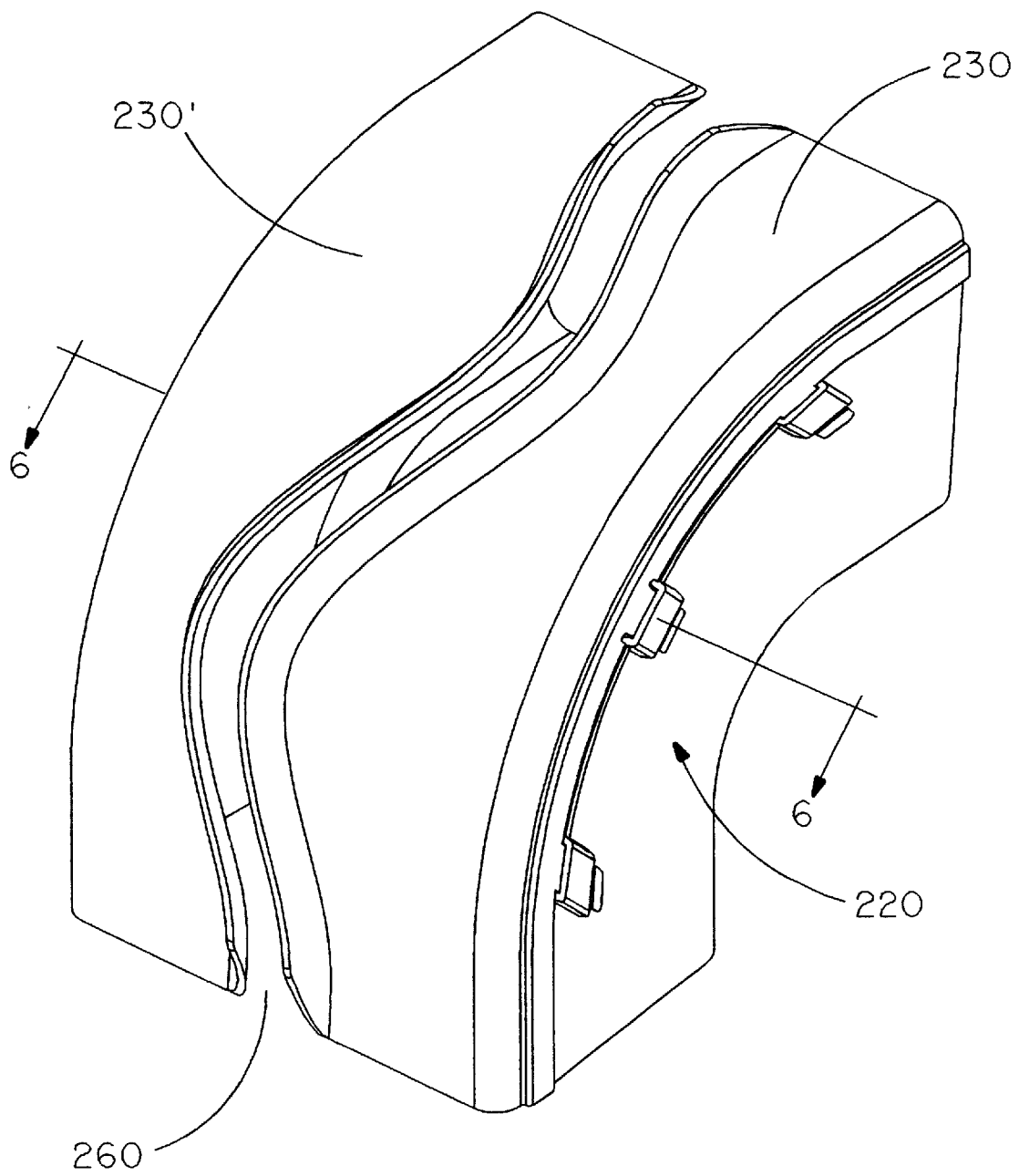
FIG. 4 is a perspective view of a fiber raceway fitting and split cover according to a second embodiment of the invention.
Figure 5:
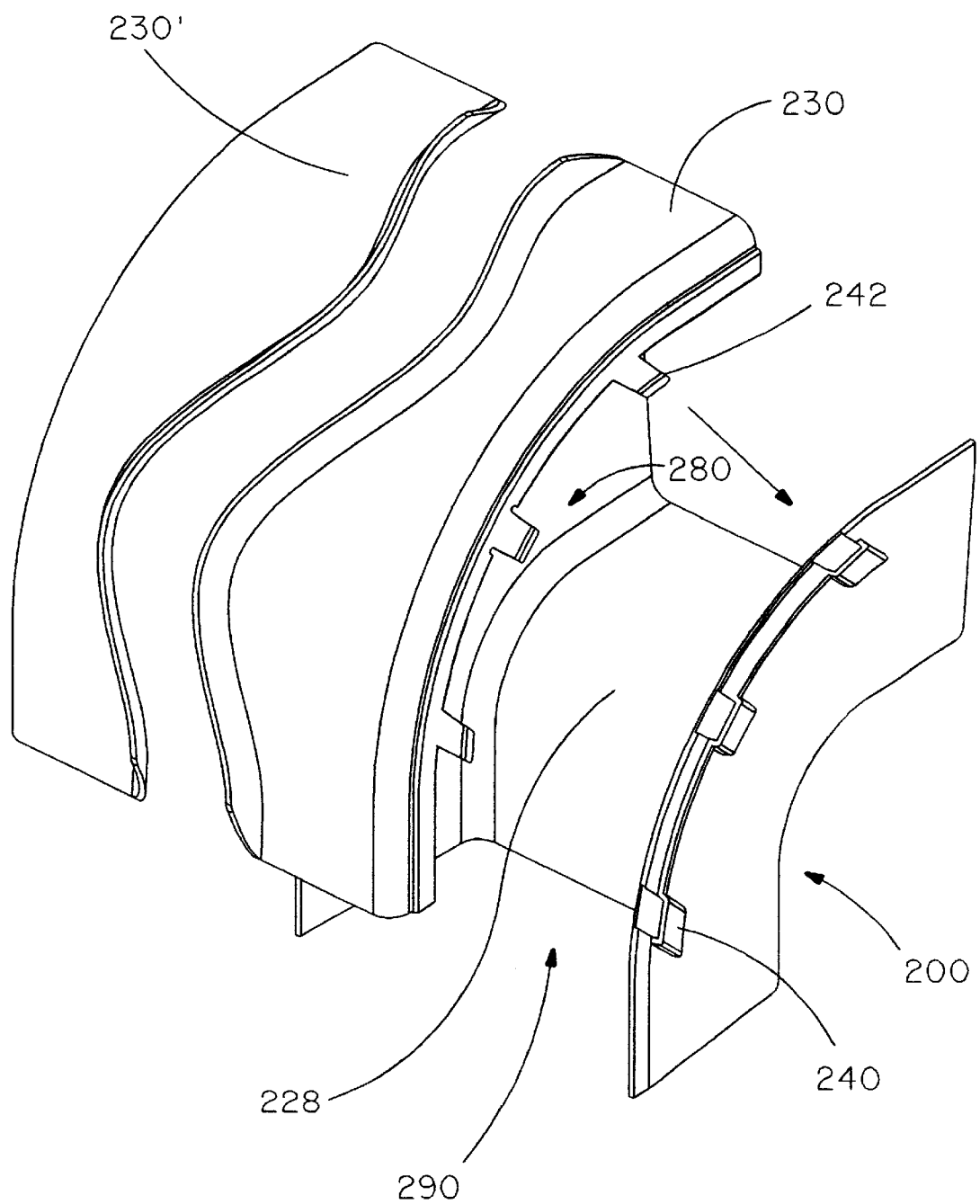
FIG. 5 is a perspective view of the fiber raceway fitting and split cover as shown in FIG. 4 with the covers partially removed.
Figure 6:
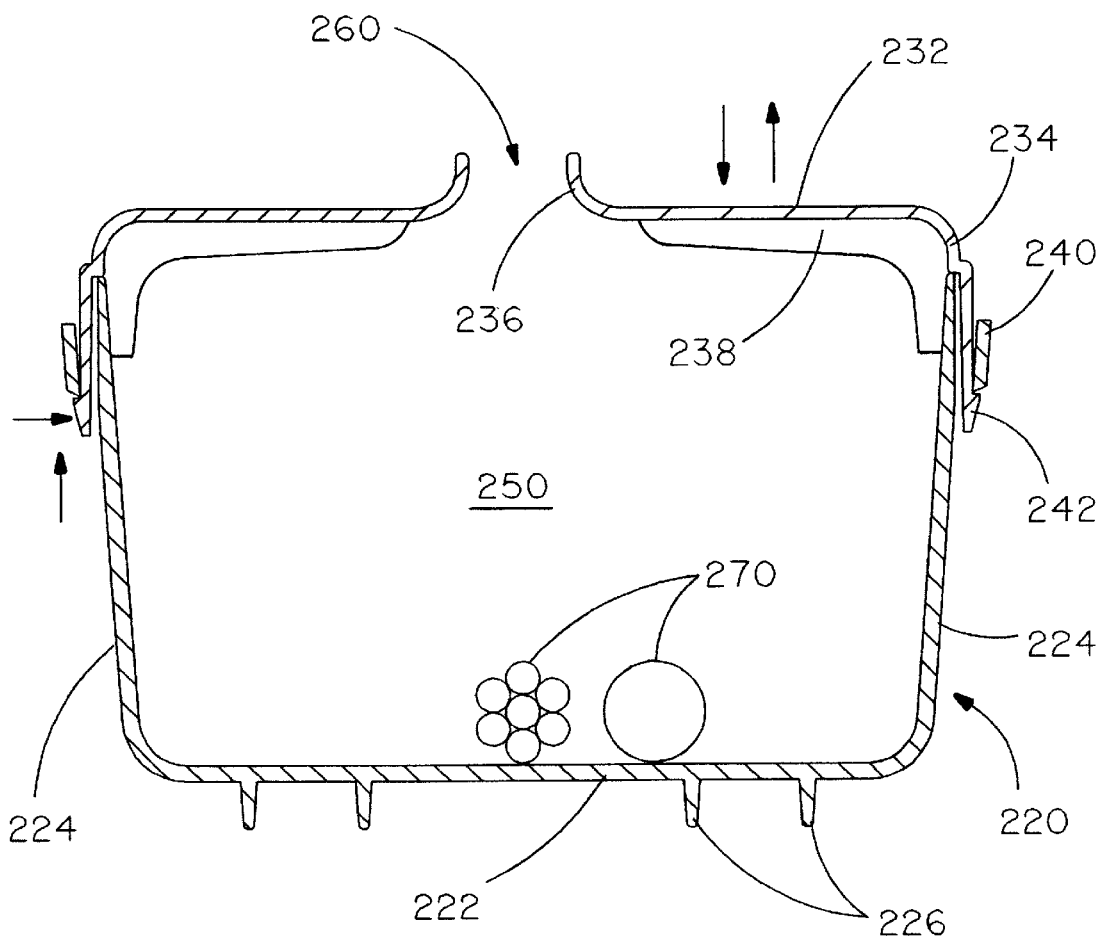
FIG. 6 is a cross-sectional view taken along line 6—6 of FIG. 4.

With reference to FIGS. 4–6, a second embodiment of the invention will be described. In this embodiment, the raceway system is substantially the same as the first embodiment. However, in this embodiment, rather than having a smooth longitudinally extending slot as in the first embodiment, a curved or sinusoidal slot 260 is provided. Additionally, in this embodiment, the raceway section is a different right angle corner fitting 200 in which the covers 230, 230' are arcuate. However, this embodiment is not limited to such a raceway section and may be used with any raceway fitting including, but not limited to, straight raceway troughs, right angle comer fittings, 45 degree comer fittings, T fittings, four-way intersection (X) fittings, and the like.

Each raceway section 200 is made up of a base member 220, preferably formed in a generally U-shape, and the two split covers 230, 230' that are removably affixed to the base member 220. As in the first embodiment, the base member 220 includes a bottom wall 222 and two side walls 224, 224', which may be integrally formed or otherwise affixed together. The base member 220 preferably also includes one or more longitudinal ribs 226 on a lower surface of the bottom wall. The bottom wall 222 and side walls 224, 224' define a cable receiving channel 250, a longitudinally extending top opening 280, and one or more open ends 290. As in the first embodiment, the cable receiving channel may include one or more partition walls (unshown) running longitudinally to separate cables. Additionally, for use with fiber optic cable, the corner fittings such as the right angle fitting shown may be formed to have an inner angled corner wall portion 228 with a desired minimum bend radius, such as 2".

Each cover 230, 230' includes a laterally extending cover portion 232, an outside edge portion 234, which may be flanged, and an inside edge portion 236, which is preferably upwardly curved. The covers are preferably rigid or semi-rigid and may be formed from any suitable material, such as metal or more preferably plastic. To increase the rigidity of the cover, reinforcing ribs 238 may be provided as in the first embodiment.

The split covers 230, 230' are independently removable from the base member and can be removably affixed by any suitable method. As in the first embodiment, a buckle ring 240 and snap-shaped hook 242 arrangement is used to affix the covers 230, 230' onto the base member 220. Assembly of the covers 230, 230' is the same as the first embodiment.

As in the first embodiment, a slot 260 is provided between the inside edges 236 of the covers. This slot is preferably sized to allow passage of an individual cable or a small cable bundle 270. As the slot 260 is relatively narrow relative to the width of the cable receiving channel 250, the slot substantially shields the cable receiving channel 250 and substantially prevents cables from inadvertently falling out of the channel. The ability to refrain removal is enhanced in this embodiment as the curved slot is less likely to match with the orientation of the cable so that the cable will not inadvertently slide out of the cable receiving channel 250 on its own.

As in the first embodiment, cables can be installed and/or removed by several methods, including installation of large bundles by removal of both covers 230, 230', installation or removal of smaller bundles by selectively removing only one of the covers 230, 230', or installation or removal of individual or even smaller bundles of cables 270 through the slot 260 without the removal of the covers.

Figure 7:
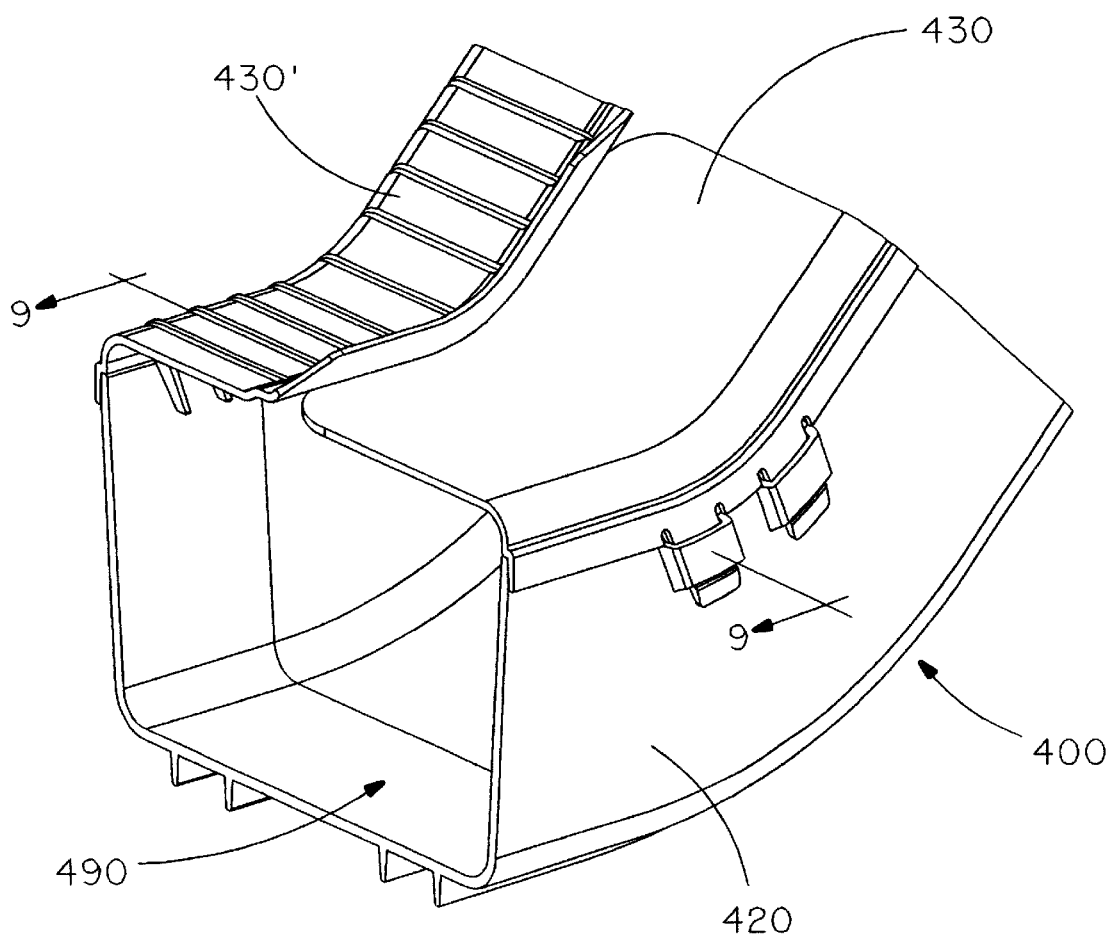
FIG. 7 is a perspective view of a fiber raceway fitting and split cover according to a third embodiment of the invention.
Figure 8:
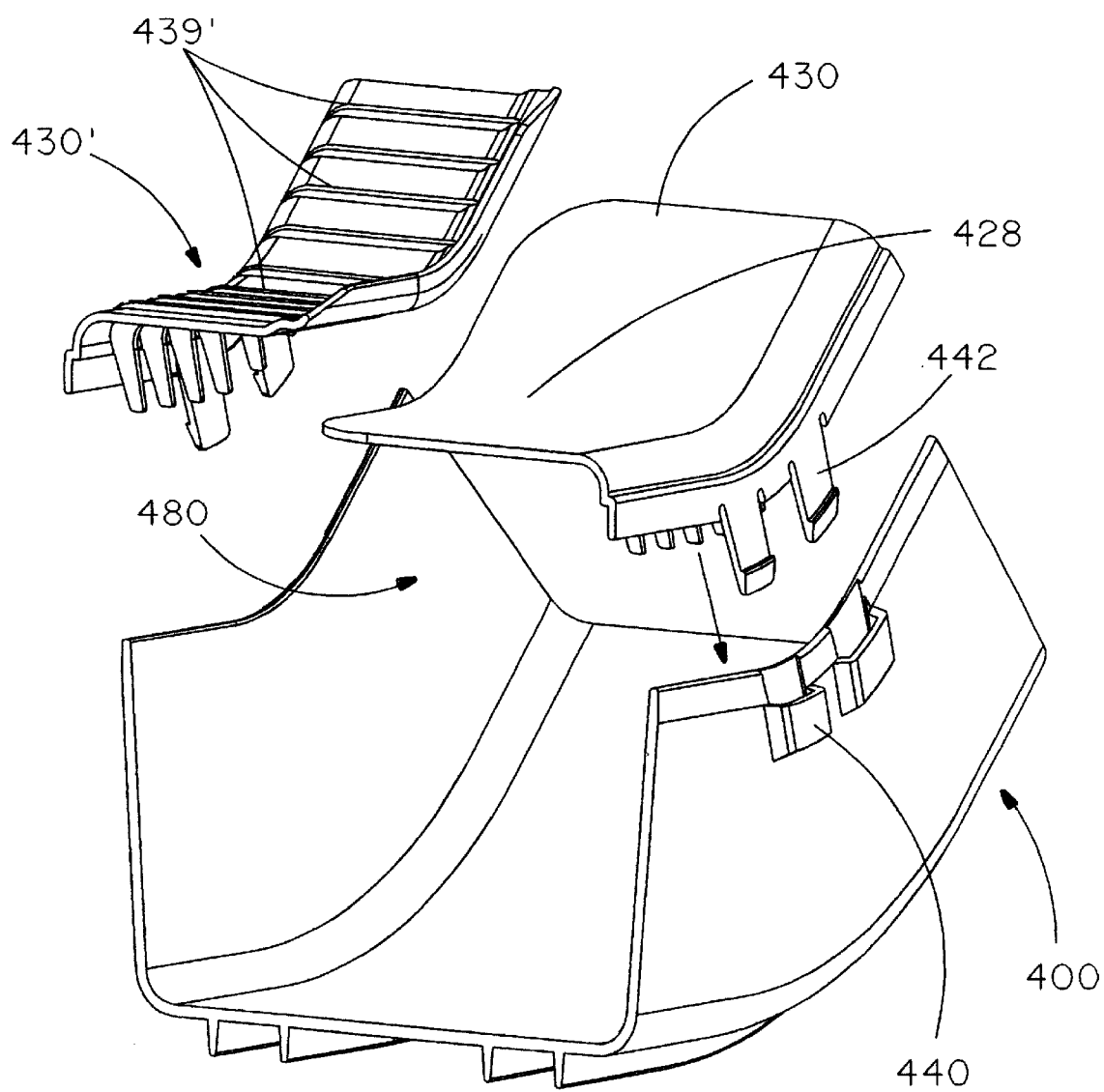
FIG. 8 is a perspective view of the fiber raceway fitting and split cover as shown in FIG. 7 with the covers partially removed.
Figure 9:
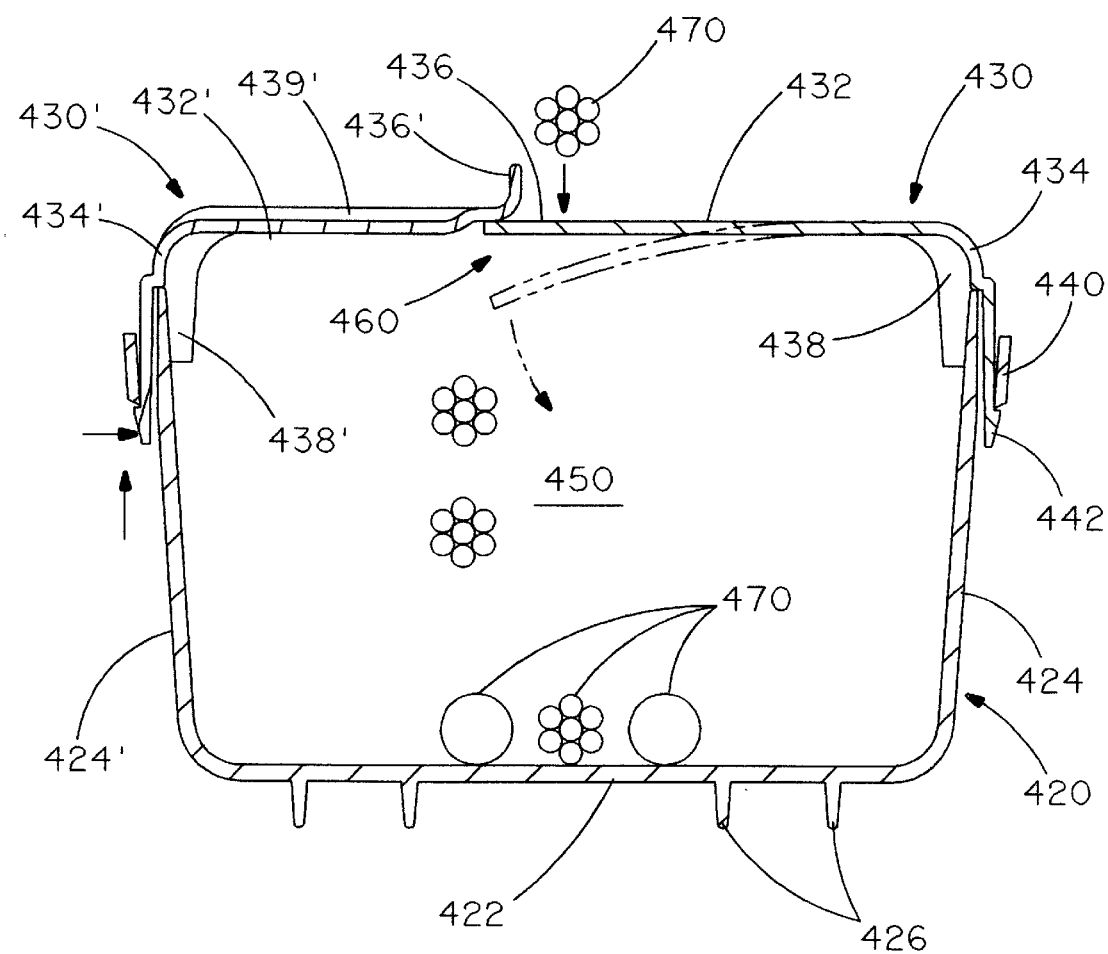
FIG. 9 is a cross-sectional view taken along line 9—9 of FIG. 7.

With reference to FIGS. 7–9, a third embodiment of the invention will be described. In this embodiment, the raceway system uses an exemplary 45 degree angle fitting. However, it is equally applicable to other raceway fitting or trough configurations. This embodiment differs from the previous embodiments in that the two split covers abut or overlap each other slightly so that the cable receiving cavity is fully covered during most uses. However, one of the covers is designed to be resilient or flexible to allow for the creation of a slot 460 that will allow installation of or removal of one or more cables from the cable receiving channel. Upon insertion of the cable, the cover returns to a closed position to close slot 460.

Each raceway section 400 is made up of a base member 420, preferably formed in a generally U-shape, and the two split covers 430, 430' that are removably affixed to the base member 420. As in the second embodiment, the base member 420 includes a bottom wall 422 and two side walls 424, 424', which may be integrally formed or otherwise affixed together. The base member 420 preferably also includes one or more longitudinal ribs 426 on a lower surface of the bottom wall. The bottom wall 422 and side walls 424, 424' define a cable receiving channel 450, a longitudinally extending top opening 480, and one or more open ends 490. As in the first embodiment, the cable receiving channel may include one or more partition walls (unshown) running longitudinally to separate cables. Additionally, for use with fiber optic cable, the corner fittings such as the inside 45° fitting shown may be formed to have an inner angled corner wall portion 428 with a desired minimum bend radius, such as 2".

Each cover 430, 430' includes a laterally extending cover portion 432 or 432', an outside edge portion 434 or 434', which may be flanged, and an inside edge portion 436 or 436' In this embodiment, one of the covers 430' includes an upwardly curved lip at the inside edge portion 436' while the other cover 430 has a straight edge. The cover 430' is preferably rigid or semi-rigid and may include reinforcing ribs 438' at the outer edge portion 434'.

Additionally, the cover 430' may have laterally extending reinforcing ribs 439' formed on an external surface of the cover 430' Since there are no ribs on an interior top surface of the of the cover 430' near the inner edge portion 436', the interior top surface of the cover 430' is smooth near the inner edge portion 436' Therefore, when a cable is installed as described below, the cable will only encounter smooth surfaces and will not be damaged as would be the case if the cable were to encounter ribs formed on an interior top surface of the cover 430'.

In this embodiment, at least one of the laterally extending portion 432 and the inner edge portion 436 of cover 430 is resilient or flexible to allow limited movement as shown. A preferred material for the flexible portion of split cover 430 is acronitrile butadiene styrene (ABS). In this embodiment, it is preferable to omit reinforcing ribs 438 from at least laterally extending cover portion 432. However, the outer edge portion 434 may include a reinforcing rib 438 as shown to provide sufficient rigidity for the split cover to retain its shape.

The split covers 430, 430' are independently removable from the base member and can be removably affixed by any suitable method. As in the previous embodiments, a buckle ring 440 and snap-shaped hook 442 arrangement is used to affix the covers 430, 430' onto the base member 420. Assembly of the covers 430, 430' is the same as the first embodiment.

As in the previous embodiments, cables can be installed and/or removed by several methods, including installation of large bundles by removal of both covers 430, 430' or installation or removal of smaller bundles by selectively removing only one of the covers 430, 430' It will be appreciated that, since the cover 430' overlaps the cover 430 as discussed below, the cover 430' must be removed before the cover 430 can be removed. Thus, when only one cover is removed, it will naturally be the cover 430'.

This embodiment also allows installation or removal of individual or even smaller bundles of cables 470 without the removal of the covers. However, how this is achieved differs in this embodiment. As shown in solid form, the two split covers 430, 430' abut or overlap each other to completely cover the top of the cable receiving channel 450. However, as one of the covers 430 is flexible, one can install or remove cable by pushing down on the inside edge of cover 430 so that the cover 430 will flex downward as shown in dotted outline form and pushing a cable 470 into or out of the cable receiving channel 450. Upon the full insertion or removal of the cable, the flexible cover 430 returns to the closed position.

While the systems of the invention have been described in conjunction with the specific embodiments outlined above, it is evident that many alternatives, modifications and variations will be apparent to those skilled in the art. Accordingly, the exemplary embodiments are intended to be illustrative, not limiting. Various changes may be made without departing from the spirit and scope of the invention.

What is claimed is:

1. A raceway section forming part of a raceway system, the raceway section comprising:

a base member having a bottom wall and two side walls defining a cable receiving channel therebetween with a longitudinally extending top opening; and two split covers independently removably attached to respective ones of said side walls, said split covers each having a laterally extending cover on an outside edge portion, and an inside edge portion, wherein said split covers each cover a portion of said longitudinally extending top opening and said inside edge portions are juxtaposed to form a longitudinally extending slot sufficiently wide to allow the removal or insertion of a cable through said slot without removal of the split covers, wherein said slot has a curved path that does not follow the curvature of said raceway section.

2. The raceway section of claim 1, wherein said inside edge portions of said split covers are spaced from each other to define said longitudinally extending slot.

3. The raceway section of claim 1, wherein at least one of said inside edge portions has an outwardly curved lip.

4. The raceway section of claim 3, wherein said section is an angled fitting and said slot provides bend radius control during insertion or removal of cables through said slot.

5. The raceway section of claim 1, wherein said split covers are provided with one of a snap-shaped hook and a buckle ring and said base member is provided with the other of a snap-shaped hook and a buckle ring, said snap-shaped hook and buckle ring forming an affixing structure for removably affixing said split covers to said base member.

6. The raceway section of claim 5, wherein a plurality of snap-shaped hooks and buckle rings are spaced longitudinally on the raceway section.

7. The raceway section of claim 1, wherein at least one of said split covers includes one or more reinforcement ribs to support said outer edge portion and said laterally extending portion.

8. The raceway section of claim 1, wherein said section is one of a straight section, a right angle corner fitting, a 45 degree corner fitting, a T fitting, and a four-way intersection fitting.

9. A raceway system comprising a plurality of the raceway sections of claim 1 coupled together at respective longitudinal ends.

10. The raceway section of claim 9, wherein said plurality of sections are selected from the group consisting of a straight section, a right angle corner fitting, a 45 degree corner fitting, a T fitting, and a four-way intersection fitting.

11. A raceway system comprising at least two raceway sections coupled together, at least one of the raceway sections comprising:

a base member having a bottom wall and two side walls defining a cable receiving channel therebetween having a longitudinally extending top opening; and two split covers independently removably attached to respective ones of said side walls, said split covers each having a laterally extending cover portion, an outside edge portion, and an inside edge portion, wherein said split covers each cover a portion of said longitudinally extending top opening and said inside edge portions are juxtaposed to form a longitudinally extending slot sufficiently wide to allow the removal or insertion of a cable through said slot without removal of the split covers, wherein said slot has a curved path that does not follow the curvature of said raceway section.

12. A raceway section forming part of a raceway system, the raceway section comprising:

a base member having a bottom wall and two side walls defining a cable receiving channel therebetween with a longitudinally extending top opening; and two split covers independently removably attached to respective ones of said side walls, said split covers each having a laterally extending cover portion, an outside edge portion, and an inside edge portion, wherein each of said inside edge portions has an outwardly curved lip, wherein said split covers each cover a portion of said longitudinally extending top opening and said inside edge portions are juxtaposed to form a longitudinally extending slot sufficiently wide to allow the removal or insertion of a cable through said slot without removal of the split covers.

13. The raceway section of claim 12, wherein said inside edge portions of said split covers are spaced from each other to define said longitudinally extending slot.

14. The raceway section of claim 12, wherein said section is an angled fitting and said slot provides bend radius control during insertion or removal of cables through said slot.

15. The raceway section of claim 12, wherein said slot extends substantially parallel with one of said side walls.

16. The raceway section of claim 12, wherein said split covers are provided with one of a snap-shaped hook and a buckle ring and said base member is provided with the other of a snap-shaped hook and a buckle ring, said snap-shaped hook and buckle ring forming an affixing structure for removably affixing said split covers to said base member.

17. The raceway section of claim 16, wherein a plurality of snap-shaped hooks and buckle rings are spaced longitudinally on the raceway section.

18. The raceway section of claim 12, wherein at least one of said split covers includes one or more reinforcement ribs to support said outer edge portion and said laterally extending portion.

19. The raceway section of claim 12, wherein said section is selected from the group consisting of a straight section, a right angle corner fitting, a 45 degree corner fitting, a T fitting, and a four-way intersection fitting.

20. A raceway system comprising a plurality of the raceway sections of claim 12 coupled together at respective longitudinal ends.

21. The raceway section of claim 20, wherein said plurality of sections are selected from the group consisting of a straight section, a right angle corner fitting, a 45 degree corner fitting, a T fitting, and a four-way intersection fitting.

* * * * *

UNITED STATES PATENT AND TRADEMARK OFFICE
CERTIFICATE OF CORRECTION

PATENT NO.   : 6,476,327 B1
DATED        : November 5, 2002
INVENTOR(S)  : Bernard et al.

It is certified that error appears in the above-identified patent and that said Letters Patent is hereby corrected as shown below:

Column 1,
Line 21, both instances of "comer" should be -- corner --.

Column 2,
Lines 12 and 13, "comer" should be -- corner --.
Line 57, the "i" in "in" should be capitalized.
Line 65, the period is missing from the sentence ending with "cabling".

Column 4,
Line 59, both instances of "comer" should be -- corner --.

Column 5,
Line 10, "comer" should be -- corner --.

Column 6,
Line 3, "comer" should be -- corner --.

Column 7,
Line 9, "portion," is missing after the word "cover" and "on" was not in the original application.

Column 8,
Line 50, "comer" should be -- corner --.

Signed and Sealed this

Sixth Day of January, 2004

JAMES E. ROGAN
*Director of the United States Patent and Trademark Office*

UNITED STATES PATENT AND TRADEMARK OFFICE
CERTIFICATE OF CORRECTION

PATENT NO. : 6,476,327 B1
DATED : November 5, 2002
INVENTOR(S) : Bernard et al.

It is certified that error appears in the above-identified patent and that said Letters Patent is hereby corrected as shown below:

Column 7,
Line 49, "comer" should read -- corner --.

Column 8,
Line 56, "comer" should read -- corner --.

Signed and Sealed this

Twelfth Day of October, 2004

JON W. DUDAS
*Director of the United States Patent and Trademark Office*